United States Patent Office.

BENJAMIN R. NICKERSON, OF SAN FRANCISCO, CALIFORNIA.

Letters Patent No. 107,620, dated September 20, 1870.

IMPROVEMENT IN PRESERVING AND HARDENING WOOD.

The Schedule referred to in these Letters Patent and making part of the same.

*To all whom it may concern:*

Be it known that I, BENJAMIN R. NICKERSON, of the city of San Francisco, in the county of San Francisco and State of California, have invented a new and useful Improvement in Preparing and Hardening Wood, for the purpose of preserving the same; and I do hereby declare that the following is a full, clear, and exact description thereof.

My invention relates to an improvement upon the method of hardening and preparing wood for preservation, for which Letters Patent No. 60,794 were granted to J. L. Samuels, January 1, 1867; and Its nature consists in combining, with the solution of sulphate of iron used in the first stage of said process, a soluble arsenite, which will be decomposed by the solution of lime used in the second stage, forming an insoluble arsenite of lime in the pores of the wood, in combination with the insoluble lime and iron salts, resulting from the decomposition of the lime and iron solution.

I make a solution of sulphate of iron in water, in about the proportions of a pound of sulphate of iron to each and every gallon of water. To this solution I add a saturated solution of arsenite of soda or potash, in the proportion of one part of said saturated solution to every ten parts of such solution of sulphate of iron. I inject this compound solution into the pores of the wood or timber, in any of the common or known methods in use, by exhaustion or pressure.

I also make a solution of caustic lime in about the proportions of three-fourths of a pound of lime to each gallon of water, or, in other words, as much lime as the water will hold in solution; and this last-mentioned solution I inject into the wood in like manner as the former.

Although these several solutions may be successively injected into the wood, as before stated, in any of the common or known methods in use, by exhaustion and pressure, I will here state the method or process which I prefer, and have practiced.

I place the wood or timber to be treated in an iron cylinder, sufficiently strong to withstand two hundred and fifty pounds of hydraulic pressure to the square inch. I then fill the cylinder with steam, thirty pounds pressure, producing a pressure of about 250° Fahrenheit, in order to vaporize the sap and natural moisture of the wood, and to coagulate the albumen, and such constituents of the wood as are coagulable, and as are capable of acting as ferments, to destroy or impair the life of the wood.

After the steam has remained in the cylinder from thirty to forty minutes, I apply strong vacuum-pumps, by which I extract all or nearly all of the moisture and air remaining in the treated cells or pores of the wood.

I then introduce the compound solution of sulphate of iron and arsenite of soda, or potash, applying hydraulic pressure, varying from one hundred and twenty-five pounds to two hundred and fifty pounds to the square inch, according to the length and condition of the wood being treated, holding the pressure from thirty to sixty minutes; after which, I again introduce steam, as before described, to vaporize the water carried into the pores of the wood with the compound solution of sulphate of iron and arsenite of soda, or potash, and again use the vacuum-pumps to extract the moisture.

I then fill the cylinder, as before, with the solution of lime, above described, using hydraulic pressure sufficient to drive the liquid through the heated pores the entire length of the timber being treated.

The effect of the introduction of the solution of lime is, that it combines with the sulpuric and arsenious acid, in combination with the iron and soda or potash, of the compound solution remaining in the pores of the wood; and the result is to form insoluble sulphate of lime and protoxide of iron, and insoluble arsenite of lime, which remain attached to the fiber of the wood, rendering it in a high degree impervious to the influence of wet and dry-rot, and proof against the attacks of the toredo, and other marine animals which are destructive to timber immersed or liable to be immersed in tide waters.

What I claim as my invention, and desire to secure by Letters Patent, is—

The method of preparing wood, to harden and preserve the same by injecting into the cells or pores thereof, successively, the compound solution of sulphate of iron and soluble arsenite, and the solution of common lime, substantially as herein set forth.

BENJ. R. NICKERSON.

Witnesses:
J. J. COOMBS,
CHAS. L. COOMBS.